United States Patent [19]

Buss et al.

[11] 3,914,127

[45] Oct. 21, 1975

[54] METHOD OF MAKING CHARGE-COUPLED DEVICES

[75] Inventors: Dennis D. Buss, Richardson; Alan R. Reinberg, Dallas, both of Tex.

[73] Assignee: Texas Instruments Incorporated, Dallas, Tex.

[22] Filed: Nov. 23, 1973

[21] Appl. No.: 418,513

[52] U.S. Cl. .......................... 96/36; 156/3; 427/88

[51] Int. Cl.[2] ...................... B44D 1/18; C23C 15/00

[58] Field of Search ........... 117/212, 93.1 GD, 217; 156/17, 2, 7

[56] References Cited

UNITED STATES PATENTS 3,298,062 3/1974 Mroczeck et al. ................. 117/212

3,607,381 9/1971 Fairbairn .......................... 117/212

*Primary Examiner*—John D. Welsh

*Attorney, Agent, or Firm*—Harold Levine; James T. Comfort; William E. Hiller

[57] ABSTRACT

Methods of making charge-coupled devices are disclosed, which include deposition of a thin, highly insulating coating of an oxide or nitride of a metal or semimetal on a patterned first metal electrode layer. The insulating layer is plasma deposited, and a second metal electrode layer is then deposited and patterned. In the illustrated embodiment, the first metal layer is patterned in the same reactor in which the insulating coating is applied, eliminating handling of the device immediately prior to the critical step of deposition of the thin insulating coating.

22 Claims, 6 Drawing Figures

METHOD OF MAKING CHARGE-COUPLED DEVICES

BACKGROUND OF THE INVENTION

This invention relates generally to a process for making a device wherein an etched metal layer is covered with a protective or insulating coating. In the illustrative embodiments, the invention relates to fabrication of a two-level charge-coupled device.

The charge-coupled semiconductor device is a relatively new type of information-handling structure. The device stores a minority-carrier charge in potential wells created at the surface of a semiconductor and, moving the potential wells, transports the charge along the surface. The device comprises, in its simplest form, closely spaced metal electrodes which overlay an insulating coating deposited on a uniformly doped semiconductor substrate.

The charge-coupled device has a high transfer efficiency, and as a result such devices have found wide application in the art, for example as image sensors. Such devices are assuming increasing commercial importance, and various methods of construction have been suggested and employed.

One previously suggested method of construction has been the high temperature oxidation of a refractory metal. A second method has been liquid anodization. Deposition of the critical insulating coating in a relatively low temperature glow discharge reactor can be used when the electrode material is a nonrefractory metal such as aluminum.

However, handling of the device prior to insulator growth or deposition is likely to introduce impurities, and it is especially critical that impurities not be introduced prior to the deposition of the thin insulating coating.

It would be desirable if a process for fabrication of such a device could be provided, which would not require the use of high temperatures.

It would further be desirable if such a process could be provided which would require minimum handling of the device during fabrication.

It would also be desirable if such a process could be provided which would require minimum handling and at the same time could be performed at relatively low temperatures.

It would especially be desirable if a process could be provided which would eliminate handling, and thus guard against the introduction of impurities, prior to the deposition of an insulating coating on a first metal electrode layer.

These advantages and others are accomplished by use of the present invention.

SUMMARY OF THE INVENTION

The invention provides methods for low-temperature fabrication of a two-level charge-coupled device which may be operated either 2-phase or 4-phase.

In accordance with the invention, an oxide layer is grown over the entire surface of a semiconductor wafer, and a first metal electrode layer is deposited on the oxide layer. The metal layer is etched, and an insulating nitride or oxide coating is deposited in low temperature plasma to a thickness of 1,000–4,000 A. A second metal electrode layer is deposited on the insulating coating and etched.

In accordance with one particularly advantageous embodiment of the invention, the metal of the first layer is etched in the plasma. The removal of photoresist and deposition of the insulating coating are then performed in the same reactor, thus minimizing handling of the device and avoiding contamination prior to deposition of the insulating coating.

BRIEF DESCRIPTION OF THE DRAWINGS

In order that the invention may be more clearly understood, the description which follows will be made with reference to the accompanying drawings which constitute a part of this specification, and wherein.

DETAILED DESCRIPTION OF PREFERRED EMBODIMENTS

The invention will be described in terms of preferred embodiments which applicants believe to represent the best mode of the invention at the time of this application.

Figure 1:
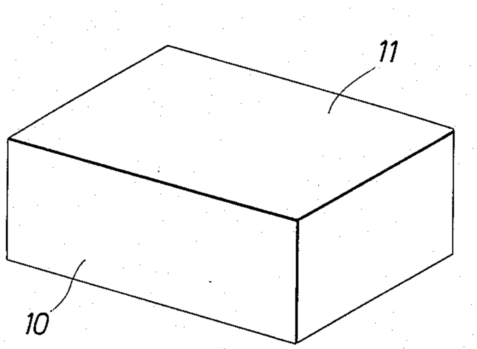
FIG. 1 is a pictorial view of a portion of a slice utilized to make a device in accordance with the processes of this invention.

Referring to the embodiments of the invention illustrated in FIGS. 1–6, a slice of a semiconducting material such as silicon is provided, a segment of which is represented by the wafer 10. The wafer 10 as shown in FIG. 1, presents a major face 11 which, for ease of description, will be referred to as the "upper" face or surface of the wafer. The wafer 10 is relatively thick in comparison with the thin films to be applied thereto, for example, it may be thicker than about 5 mils.

Over the entire surface area of the major face 11 is grown an oxide layer 12, such as silicon dioxide, $SiO_2$, in any suitable manner well known in the art. For example, the oxide layer may be grown by heating the wafer to a temperature of about 1,300°C in the presence of oxygen. The thickness of the layer 12 is desirably on the order of about 1,000–2,000 A.

For ease of description, the wafer 10 having the oxide layer 12 thereon may be referred to as a substrate 13.

A first metal electrode layer 14 is then applied to the substrate 13 on the upper surface of the oxide layer 12. The metal selected for the layer 14 is desirably one which may be effectively etched in a relatively low-temperature glow discharge reactor. Aluminum (Al), Molybdenum (Mo), Tungsten (W), and Tantalum (Ta) are examples of metals suitable for this purpose. This example will be in terms of aluminum, which is easily deposited but somewhat more difficult to etch than some of the other suitable metals.

The aluminum (or other metal) layer 14 is desirably deposited by conventional vacuum evaporation techniques, wherein the aluminum is deposited in a vacuum and deposited to the desired thickness of about 8,000–12,000 A on the oxide layer 12.

Electron-beam deposition or chemical reaction may be used to deposit the layer 14, in accordance with methods well known in the art. The exact thickness of the layer 14 is not critical to this invention, the thickness listed above being one which is advantageous.

In some instances, good ohmic contact may not be obtained between the aluminum layer 14 and the semiconductor. If necessary, good ohmic contact can be obtained by sintering the aluminum. This may be accomplished by heating the aluminum layer to about 400–450°C for approximately 15 to 45 minutes, whereupon the aluminum alloys in a thin film on the surface.

Etching of the layer 14 is desirably accomplished by employing photographic masking and etching techniques. If the metal of the layer 14 is one such as aluminum which may have to be etched at a temperature greater than a photoresist can withstand, then an intermediate etch mask 22 of oxide or nitride is deposited on the metal layer 14 prior to application of the photoresist, rather than direct application of the photoresist to the metal layer.

Figure 2:
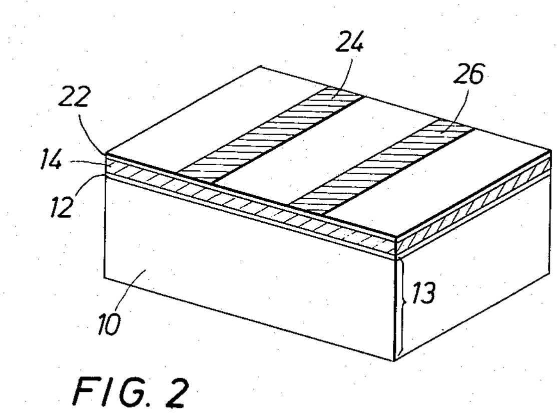
FIG. 2 is a view similar to FIG. 1, showing the device at an early stage in the process in accordance with this invention.

The photoresist, a light-sensitive coating that is exposed and developed prior to etching, is then applied and masked in the areas indicated at 24 and 26 in FIG. 2. The photoresist is then exposed and developed.

In accordance with this preferred embodiment of the invention, the wafer is then placed inside a suitable glow discharge reactor, such as the radio frequency radial flow glow discharge reactor disclosed in U.S. Pat. No. 3,757,733 of Alan R. Reinberg, entitled "Radial Flow Reactor." As is pointed out in that patent, it has been found that the controlled dissociation and recombination of gaseous mixtures in a glow discharge is a useful method for depositing polymerized thin films. Films of oxides, nitrides or carbides of metals or semimetals may be formed by the controlled dissociation and selective combination of volatile metal or semimetal containing compounds in a low pressure glow discharge.

Glow discharge deposition is also commonly referred to as plasma deposition. Plasma is defined as a state within a gas in which there are substantially equal number of positively and negatively charged particles, the positive particles being ions and the negative particles being electrons. The plasma may be established in a number of ways as described in the aforementioned patent.

The major advantage of plasma deposition is the relatively low temperature, generally in the range of 200°C, at which highly stable coatings of nitrides, oxides, etc., may be formed, which coatings may be used, for example, for gate dielectrics, light guides, etch masks, etc.

Although the present invention may be of particular utility with respect to the reactor disclosed in the aforementioned application, the description which follows will reveal that the invention is by no means limited to use in conjunction with that apparatus.

Following placement of the wafer carrying the metal layer 14 and etch mask 22 into the reactor, the metal layer 14 is etched in the plasma.

Figure 3:
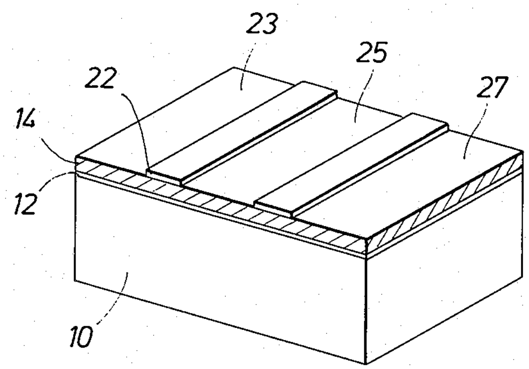
FIGS. 3–5 are views similar to FIG. 2, showing the device at further stages in the process in accordance with this invention.
Figure 4:
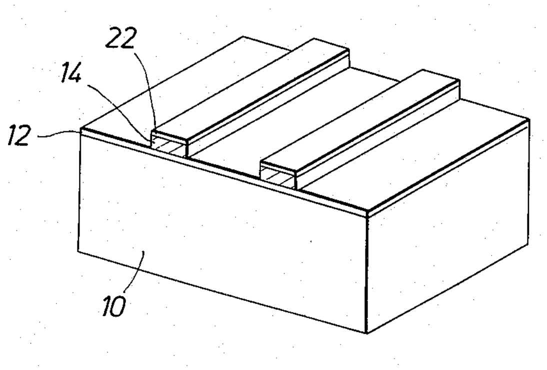
Figure 5:
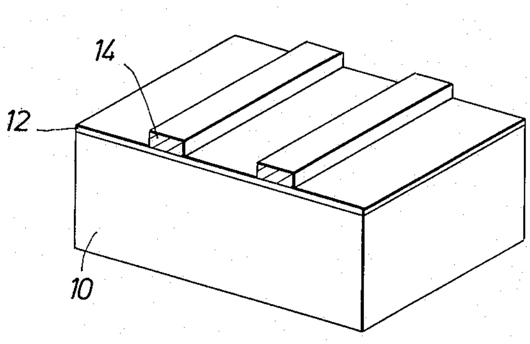

In the embodiment discussed, the etching of the layer 22 is desirably accomplished with carbon tetrafluoride at low temperature, less than about 150°C, in any convenient manner such as that described in U.S. Pat. No. 3,615,956. Such etching is effective to remove all portions of that layer not lying directly beneath the areas 24 and 26 of the photoresist. This exposes the upper surface of the metal layer 14 in the areas 23, 25, and 27 (FIG. 3).

The slice is then desirably heated in the reactor to a convenient temperature (e.g., less than about 150°C) sufficient to ash the photoresist in situ. Ashing is a term commonly applied to plasma removal of organic material by use of an oxygen plasma.

Using the coating 22 as a mask, the metal layer is then etched in the areas 23, 25 and 27 by using a suitable etching agent. For example, the metal layer 14 of aluminum may be etched by contact with chlorine gas or a chlorine-containing gas such as $CCl_4$, resulting, in this embodiment, in the structure shown in FIG. 4. Etching of this type is discussed in the aforementioned U.S. Pat. No. 3,615,956.

If desired the nitride or oxide may then be stripped with $CF_4$ or other suitable stripping agent in the same manner as described above, (FIG. 5), and if desired the upper surface of the metal layer may be cleaned in situ by an additional plasma process.

The next step is application of the thin highly insulating layer 16, which is preferably formed of a suitable nitride or oxide of a metal or semi-metal which can be deposited in plasma. For example, silicon nitride has been found advantageous for this purpose and is utilized in this exemplary embodiment of the invention. As examples of other suitable coatings, silicon oxide and aluminum oxide are advantageous. This layer is deposited in the plasma at a temperature of about 200°C to 400°C, to a uniform thickness which may be from about 1,000 A to about 4,000 A, over the entire upper surface of the metal layer 14 and the exposed oxide 12. It is crucial to proper performance of a charge-coupled device that there be no contamination of the surface between the exposed oxide 12 and the insulating coating 16. Thus, it is critical to this invention that no contamination of the exposed surface of oxide 12 occur prior to this step in the process.

The deposition of the layer 16 to a uniform and controlled thickness is also critical in that the layer 16 determines the inter-electrode gap and the differences in potential wells beneath the first metal layer 14, and a second metal layer to be deposited on the surface of the layer 16 opposite the layer 14.

When properly formed in this manner, the layer 16 is pinhole free and highly insulating.

Following deposition of the layer 16, the device is removed from the reactor.

A second metal layer 18, e.g., of aluminum, is then deposited in any suitable manner such as that described above in connection with the layer 14, on the upper surface of the insulating layer 16. The insulating layer 16 is thus sandwiched between the two metal electrode layers 14 and 18. This second metal layer is desirably approximately identical in thickness with the layer 14. The layer 18 may be desirably etched as in the same manner used in etching the layer 14, to yield a configuration such as shown in FIG. 6.

Figure 6:
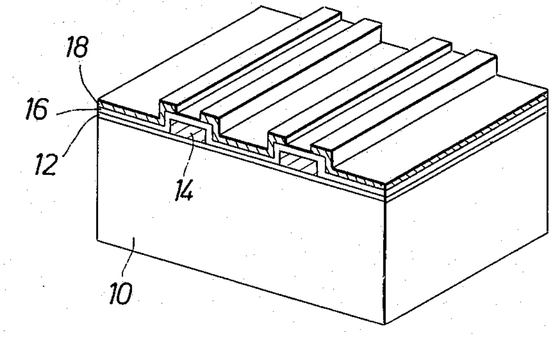
FIG. 6 is a view similar to FIGS. 1–5, showing a charge-coupled device constructed in accordance with the invention.

The resulting two level charge-coupled device 20 as shown in FIG. 6, includes conducting metal electrodes 14 and 18, separated by a highly insulating layer 16. The device may be operated either 2-phase or 4-phase.

The invention can be employed in other contexts in which it is desired to cover an etched 4etal layer with an insulating or protective coating. The charge-coupled device is an application of the invention which commands particular focus at the present time, but other context of use of the invention may now or hereafter be apparent to those of skill in the art.

A particularly advantageous feature of the invention is the ability to perform a plurality of the steps in fabrication within a reactor wherein no handling of the substrate is necessary. This minimizes the possibility of contamination. This is especially true in the illustrated embodiment wherein handling is eliminated between etching of the first metal layer and the critical step of applying the thin highly insulating coating.

Another advantageous feature of the invention is the ability to perform critical stages of the process if desired at relatively low temperatures, in a suitable glow discharge reactor.

Particularly advantageous is the fact that the process permits the use of relatively low temperatures and at the same time minimizes handling. These features are extremely important in improving the yield and reliability of processes such as those for fabrication of charge-coupled devices.

Although the invention has been described in terms of preferred embodiments, it will be apparent to those skilled in the art that various modifications might be made in the steps or materials indicated without departing from the invention, which is defined in the following claims.

What is claimed is:

1. A method of forming a device having a patterned metal layer and an insulating coating thereon, said method comprising:

forming a metal layer on a substrate, depositing an intermediate etch mask layer on the metal layer in covering relation thereto, depositing a layer of photoresist over the intermediate etch mask layer in covering relation thereto, masking the photoresist layer in preselected areas thereof to define a pattern therein, exposing the masked photoresit layer to light and developing same to provide a patterned photoresist layer overlying preselected portions of the intermediate etch mask layer and the metal layer disposed therebeneath, the remaining portions of the intermediate etch mask layer being exposed, placing the substrate with the metal layer, the intermediate etch mask layer, and the patterned photoresist layer formed thereon in a glow discharge reactor and etching the exposed portions of the intermediate etch mask layer to expose portions of the metal layer previously being covered by the portions of the intermediate etch mask layer etched away, etching the exposed portions of said metal layer, removing the patterned photoresist layer and the remaining portions of the intermediate etch mask layer disposed therebeneath to expose the patterned remaining portion of said metal layer, and forming within the glow discharge reactor by plasma deposition an insulating coating covering the remaining patterned portion of said metal layer and the substrate surface on which the remaining patterned portion of said metal layer is disposed.

2. The method in accordance with claim 1, wherein the thickness of said insulating coating is from about 1,000 to about 4,000 A.

3. The method in accordance with claim 2, wherein said insulating coating is selected from the group consisting of silicon nitride and silicon oxide.

4. The method in accordance with claim 1, wherein the metal of said metal layer is selected from the group consisting of aluminum, molybdenum, tungsten and tantalum.

5. A method in accordance with claim 1, further including coating one surface of a semiconductor wafer with an oxide layer in providing said substrate, and said metal layer being thereafter formed on the oxide layer of said substrate.

6. The method in accordance with claim 5, wherein said semiconductor wafer is silicon and said oxide layer is silicon dioxide.

7. A method in accordance with claim 1, wherein the etching of the metal layer and the forming of the insulating coating covering the remaining patterned portion of said metal layer and the substrate surface on which the remaining patterned portion of said metal layer is disposed occur within the glow discharge reactor in a successive sequence avoiding handling of the device during such sequence.

8. A method of making a charge-coupled device, comprising:

providing a semiconductor wafer, growing an oxide layer on one surface of said semiconductor wafer to provide a substrate, forming a first metal layer on the oxide layer of said substrate to provide a metal-coating substrate, placing said metal-coated substrate in a glow discharge reactor and etching the first metal layer in said reactor according to a predetermined pattern, forming within the glow discharge reactor by plasma deposition an insulating coating covering the patterned etched first metal layer and the exposed surface of said substrate on which the patterned etched first metal layer is disposed, removing the substrate with the patterned etched first metal layer and the insulating coating thereon from the glow discharge reactor, and depositing a second metal layer on said insulating coating.

9. The method in accordance with claim 8, wherein the thickness of said insulating coating is from about 1,000 to about 4,000 A.

10. The method in accordance with claim 8, wherein said insulating coating is selected from the group consisting of silicon nitride and silicon oxide.

11. The method in accordance with claim 8, wherein the metal of said metal layers is selected from the group consisting of aluminum, molybdenum, tungsten and tantalum.

12. A method in accordance with claim 8, further including patterning said second metal layer after the deposition thereof on said insulating coating.

13. A method in accordance with claim 8, further including applying an intermediate etch mask layer to said first metal layer prior to the placing of said substrate with the first metal laayer formed thereon in the glow discharge reactor, thereafter placing said substrate with the first metal layer and the intermediate etch mask layer formed thereon in the glow discharge reactor, etching the intermediate etch mask layer to provide the predetermined pattern therein for the subsequent etching of the first metal layer, and removing the etched intermediate etch mask layer following the etching of the first metal layer.

14. A method in accordance with claim 8, wherein the etching of the first metal layer and the forming of the insulating coating covering the patterned etched first metal layer and the exposed surface of said substrate on which the patterned etched first metal layer is disposed occur within the glow discharge reactor in a successive sequence avoiding handling of the device during such sequence.

15. A method of forming a device having a patterned metal layer and an insulating coating thereon, said method comprising:

forming a metal layer on a substrate, placing said substrate with the metal layer formed thereon in a glow discharge reactor and etching the metal layer according to a predetermined pattern, and forming within the glow discharge reactor by plasma deposition an insulating coating covering the patterned etched metal layer and the exposed surface of said substrate on which the patterned etched metal layer is disposed.

16. A method in accordance with claim 15, further including coating one surface of a semiconductor wafer with an oxide layer in providing said substrate, and said metal layer being thereafter formed on the oxide layer of said substrate.

17. A method in accordance with claim 15, further including applying an intermediate etch mask layer to said metal layer prior to the placing of said substrate with the metal layer formed thereon in the glow discharge reactor, thereafter placing said substrate with the metal layer and the intermediate etch mask layer formed thereon in the glow discharge reactor, etching the intermediate etch mask layer to provide the predetermined pattern therein for the subsequent etching of the metal layer, and removing the etched intermediate etch mask layer following the etching of the metal layer.

18. A method in accordance with claim 15, wherein the etching of the metal layer and the forming of the insulating coating covering the patterned etched metal layer and the exposed surface of said substrate on which the patterned etched metal layer is disposed occur within the glow discharge reactor in a successive sequence avoiding handling of the device during such sequence.

19. The method in accordance with claim 16, wherein said semiconductor wafer is silicon and said oxide layer is silicon dioxide.

20. The method in accordance with claim 15, wherein the thickness of said insulating coating is from about 1,000 to about 4,000 A.

21. The method in accordance with claim 20, wherein said insulating coating is silicon nitride.

22. The method in accordance with claim 15, wherein the metal of said metal layer is selected from the group consisting of aluminum, molybdenum, tungsten and tantalum.

* * * * *